United States Patent Office 2,765,305
Patented Oct. 2, 1956

2,765,305

AMINOALKYL AND QUATERNARY AMMONIUM ALKYL ESTERS OF o-BENZYLBENZOIC ACID

Georg E. Cronheim, Bristol, Va., and Norman H. Leake and Marvel L. Fielden, Bristol, Tenn., assignors to The S. E. Massengill Company, Bristol, Tenn., a corporation of Tennessee No Drawing. Application May 26, 1952,
Serial No. 290,081

13 Claims. (Cl. 260—247.2)

This invention relates to new organic compounds which possess therapeutic properties. More specifically it relates to new amino alcohol and quaternary ammonium alcohol esters.

The object of this invention is to provide new and useful compounds comprising aminoalkyl and quaternary ammonium alkyl esters of benzylbenzoic acid. The acid may be in the meta or para form but we prefer to use the ortho form. The amino and quaternary ammonium groups may be unsubstituted or may have one or more of the hydrogen atoms replaced by hydrocarbon radicals.

Another object is to provide new compounds which are therapeutically beneficial.

Still other objects and advantages of the invention will become obvious from the following detailed description.

The esters of our invention may be prepared by reacting the acid halide, as for example, o-benzylbenzoyl chloride with an amino alcohol or quaternary ammonium alcohol in solution. The quaternary ammonium derivatives can also be made from the tertiary aminoalcohol ester, as by reacting the ester with an alkyl halide.

The esters are generally oils, while their acid salts, such as the hydrochloride, tartrate, fumarate, sulfate and the like, are crystalline solids. Although both the free ester and its acid salts are therapeutically effective, the use of the solid salts is more convenient. The acid salts are readily prepared by the addition of the desired acid to the basic ester in solution. Neutralization of the acid salt to form the free ester is accomplished with an alkaline reagent such as sodium hydroxide or sodium carbonate.

The esterifying aminoalcohols which may be employed for our purpose comprise primary, secondary and tertiary aminoalcohols, including N-heterocyclic derivatives, as for example: ethanol amine, ethylaminoethanol, isopropylaminoethanol, cyclohexylaminopropanol, dimethylaminoethanol, diethylaminoethanol, dipropylaminoethanol, dibutylaminoethanol, β - diethylamino - α - methylethanol, γ-diethylaminopropanol, diethylaminobutanol, morpholinoethanol, piperidinopropanol and the like. The alkyl substituted aminoalkanol and the N-heterocyclicalkanol esters are particularly effective for our purpose.

The quaternary ammonium alkyl esters are preferably alkyl substituted, as with ethyl, propyl, butyl and the like. Other substituent groups may also be used such as cyclohexyl, phenyl, benzyl, etc.

More detailed practice of our invention is illustrated by the following examples which, however, do not limit the scope of the invention.

*Example 1*

98 grams of o-benzylbenzoic acid dissolved in 150 ml. of chloroform were mixed with 72 grams of thionyl chloride. The solution was refluxed for 7 hours until no more gases were evolved. Most of the excess thionyl chloride and chloroform was removed by distillation. The remainder was removed by adding and distilling out successive 50 ml. portions of benzene until there was no odor of thionyl chloride.

A solution of 58.5 grams of β-diethylaminoethyl alcohol in 50 ml. of chloroform was added to a solution of 106 grams of the o-benzylbenzoyl chloride in 100 ml. of chloroform. After standing for two days the resulting solution was refluxed for two hours. The chloroform solution was diluted with ether and washed several times with dilute hydrochloric acid. The combined acid wash was treated with charcoal and then made alkaline with sodium carbonate. The oil which separated was extracted with ether. The ether extract was washed with water, dried over anhydrous sodium sulfate and treated with charcoal. An aliquot of the resulting solution was titrated with standard acid.

600 ml. of the above ether solution of the free base was treated with a solution containing a slight excess of ethereal hydrogen chloride in 100 ml. of isopropanol. The resulting solution was diluted with 450 ml. of ether and cooled. The hydrochloride separated as nearly white crystals. After recrystallization from ethyl acetate, the white solid β-diethylaminoethyl o-benzylbenzoate hydrochloride melted at 102–4° C.

*Example 2*

γ-Diethylaminopropyl o-benzylbenzoate hydrochloride was prepared according to the method outlined in Example 1. The compound is a white crystalline solid which melts at 112–3° C.

*Example 3*

β-Diethylamino-α-methylethyl o-benzylbenzoate fumarate was prepared according to the method outlined in Example 1 except that fumaric acid was employed instead of hydrogen chloride. The compound is a crystalline solid which melts at 110–1° C.

*Example 4*

β-Morpholinoethyl o-benzylbenzoate fumarate was prepared according to the method outlined in Example 1 except that fumaric acid was employed instead of hydrogen chloride. The compound is a crystalline solid which melts at 112–3° C.

*Example 5*

An ether solution of 0.064 mol of methyl bromide was added to an ether solution of β-diethylaminoethyl o-benzylbenzoate. The oil which separated was precipitated from isopropanol and ether to give crystalline β-methyldiethylammoniumethyl o-benzylbenzoate bromide melting at 75–85° C.

The compounds of this invention are highly effective as antispasmodics. They also possess antihistaminic properties. Toxicity is low, being less than that of papaverine, which is frequently employed as a standard.

Although this invention has been described with reference to illustrative embodiments thereof, it wil be apparent to those skilled in the art that the principles of this invention may be embodied in other forms but within the scope of the claims.

We claim:

1. The compounds having the formula:

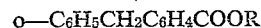

o—$C_6H_5CH_2C_6H_4COOR$ wherein R is selected from the group consisting of di-(lower-alkyl)-amino-(lower-alkyl), morpholino-(lower-alkyl), piperidino-(lower-alkyl) and the (lower-alkyl)-quaternary-ammonium salts thereof.

2. The di-(lower-alkyl)-amino-lower-alkyl esters of o-benzylbenzoic acid.

3. The lower-alkyl quaternary ammonium lower-alkyl esters of o-benzylbenzoic acid.

4. The di-(lower-alkyl)-amino-propyl esters of o-benzylbenzoic acid.

5. The solid acid salts of the di-(lower-alkyl)-amino-propyl esters of o-benzylbenzoic acid.

6. The di-(lower-alkyl)-amino-branched chain-propyl esters of o-benzylbenzoic acid.

7. The solid acid salts of the di-(lower-alkyl)-amino-branched chain-propyl esters of o-benzylbenzoic acid.

8. The morpholino-(lower-alkyl) esters of o-benzylbenzoate.

9. The solid acid salts of the morpholino-(lower-alkyl) esters of o-benzylbenzoate.

10. β-Morpholinoethyl o-benzylbenzoate fumarate.

11. β-Methyldiethylammoniumethyl o-benzylbenzoate bromide.

12. γ - Diethylaminopropyl o - benzylzoate hydrochloride.

13. β - Diethylamino - α - methylethyl o - benzyl - benzoate fumarate.

References Cited in the file of this patent

UNITED STATES PATENTS

| | | |
|---|---|---|
| 2,410,040 | Blicke | Oct. 29, 1946 |
| 2,655,504 | Krimmel | Oct. 13, 1953 |

OTHER REFERENCES

Chem. Abst., vol. 33, pp. 1710–11 (1939).